United States Patent
Hendriks

[11] Patent Number: 5,940,249
[45] Date of Patent: Aug. 17, 1999

[54] SHIELDED AIR BEARING SLIDER

[75] Inventor: Ferdinand Hendriks, Yorktown Heights, N.Y.

[73] Assignee: International Business Machines Corporation, Armonk, N.Y.

[21] Appl. No.: 08/968,762

[22] Filed: Nov. 10, 1997

[51] Int. Cl.[6] .......................... G11B 21/21; G11B 17/32; G11B 5/60

[52] U.S. Cl. ............................................................ 360/103

[58] Field of Search ............................................ 360/103

[56] References Cited

U.S. PATENT DOCUMENTS

| | | | |
|---|---|---|---|
| 4,212,044 | 7/1980 | Plotto | 360/103 |
| 4,757,402 | 7/1988 | Mo | 360/103 |
| 4,894,740 | 1/1990 | Chhabra et al. | 360/103 |
| 4,996,614 | 2/1991 | Okutsu | 360/103 |
| 5,220,470 | 6/1993 | Ananth et al. | 360/103 |
| 5,267,108 | 11/1993 | Tani | 360/103 |
| 5,377,063 | 12/1994 | Taniguchi et al. | 360/103 |
| 5,424,888 | 6/1995 | Hendriks et al. | 360/103 |
| 5,490,025 | 2/1996 | Dorius et al. | 360/103 |
| 5,751,517 | 5/1998 | Agarwal | 360/103 |

FOREIGN PATENT DOCUMENTS

| | | |
|---|---|---|
| 52-154615 | 12/1977 | Japan . |
| 54-104815 | 8/1979 | Japan . |
| 55-129970 | 10/1980 | Japan . |
| 56-047957 | 4/1981 | Japan . |
| 59-178648 | 10/1984 | Japan . |
| 59-186170 | 10/1984 | Japan . |
| 61-273784 | 12/1986 | Japan . |
| 6-259912 | 9/1994 | Japan . |
| 8-279130 | 10/1996 | Japan . |

*Primary Examiner*—William J. Klimowicz
*Attorney, Agent, or Firm*—Francis L. Conte

[57] ABSTRACT

A slider for developing an air bearing atop a spinning data disk includes a substrate having a base surface and an air bearing pad extending outwardly therefrom. The bearing pad cooperates with the spinning disk to develop the air bearing thereon for supporting the slider thereabove. A data access element is fixedly mounted in the substrate for communicating data with the disk and, a guard strip extends outwardly from the base surface and is spaced from the bearing pad to define a trench therebetween. The guard strip shields the bearing pad from debris accumulation during operation.

12 Claims, 2 Drawing Sheets

SHIELDED AIR BEARING SLIDER

BACKGROUND OF THE INVENTION

The present invention relates generally to hard disk drives, and, more specifically, to air bearing sliders therein.

In a direct access storage device (DASD) commonly referred to as a hard disk drive, data is magnetically stored on a spinning data platter or disk using a data access element configured to magnetically read or write data, or both. The data access element is mounted in a slider attached to a pivoting suspension arm for selectively positioning the slider and element at desired locations across the surface of the disk. The slider is configured with one or more air bearing pads which develop air bearings atop the spinning disk for providing lift to limit physical contact between the slider and disk during operation.

Sliders are found in various configurations since they are critical to the proper operation of the disk drive for accurately suspending the data access element atop the disk for writing data thereto or reading therefrom. Physical contact between the slider and disk is undesirable since it may damage the disk leading to data loss therein, or in the worst case a disk crash rendering the disk drive useless.

The disk and slider are typically mounted in a substantially sealed enclosure having an ambient air environment therein. The environment is substantially free of contaminants, although contaminants such as micron size debris are nevertheless present, or are created internally. Over continued operation of the disk drive, such small debris may accumulate along the leading edges of the bearing pads which reduces or closes the spacing between the pads and the spinning disk. This space defines an air inlet for the pad and allows the air bearing to develop between the pad and spinning disk. Debris accumulation on the pad leading edge is undesirable since it closes the pad inlet and reduces the effectiveness of the air bearing with a corresponding reduction or loss of lift. A reduction in the slider lifting force may then allow the slider to physically contact the spinning disk causing undesirable damage thereof and the possibility of a disk crash.

Accordingly, it is desired to provide an improved slider wherein the air bearing pads are protected from undesirable debris accumulation thereon.

SUMMARY OF THE INVENTION

A slider for developing an air bearing atop a spinning data disk includes a substrate having a base surface and an air bearing pad extending outwardly therefrom. The bearing pad cooperates with the spinning disk to develop the air bearing thereon for supporting the slider thereabove. A data access element is fixedly mounted in the substrate for communicating data with the disk and, a guard strip extends outwardly from the base surface and is spaced from the bearing pad to define a trench therebetween. The guard strip shields the bearing pad from debris accumulation during operation.

BRIEF DESCRIPTION OF THE DRAWINGS

The invention, in accordance with preferred and exemplary embodiments, together with further objects and advantages thereof, is more particularly described in the following detailed description taken in conjunction with the accompanying drawings in which:

FIG. 3 is an isometric view of the underside of the slider illustrated in

FIGS. 1 and 2 illustrating a plurality of air bearing pads and cooperating guard 11 strips in accordance with an exemplary embodiment of the present invention.

DESCRIPTION OF THE PREFERRED EMBODIMENT(S)

Figure 1:
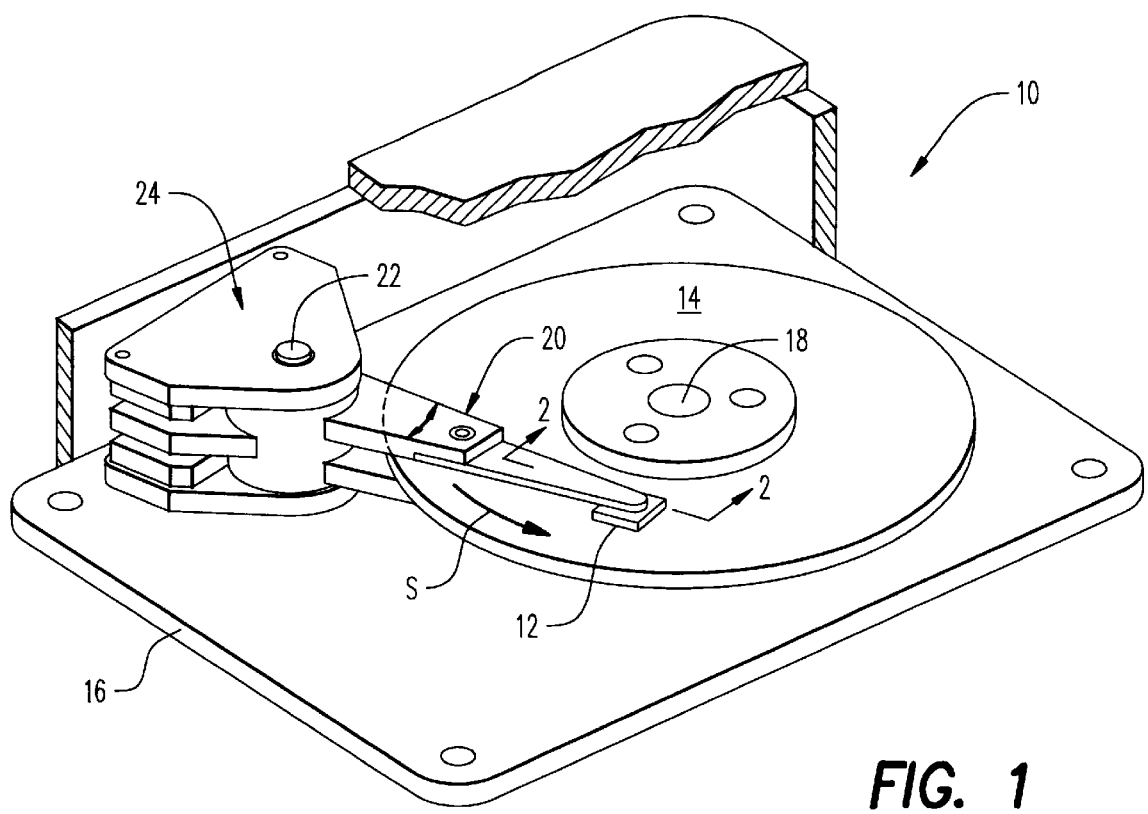
FIG. 1 is an isometric view of a portion of a hard disk drive in accordance with an exemplary embodiment of the present invention including a slider suspended atop a spinning data disk.

Illustrated in FIG. 1 is a portion of a direct access storage device (DASD) in the form of a hard disk drive 10 having a slider 12 suspended atop a data disk 14 in accordance with an exemplary embodiment of the present invention. The disk drive 10 includes a housing or frame 16, shown in part, in which the disk 14 is suitably rotatably mounted about a spindle 18 including an integral motor therein effective for rotating or spinning the disk in the exemplary counterclockwise spinning direction S illustrated.

The slider 12 is supported on a suspension arm 20 which is rotatably or pivotally joined to the housing 16 on a pivot 22. The suspension arm 20 may take any conventional form and is typically rigid near the pivot 22 and suitably flexible near the slider 12 for positioning the slider 12 at desired locations over the spinning disk 14 upon rotation of the suspension arm 20 about the pivot 22. This is accomplished typically by using a conventional voice coil motor (VCM) 24 which includes a coil fixedly joined to an opposite end of the suspension arm 20 which cooperates with a pair of permanent magnets for selectively positioning the suspension arm 20 as desired.

Figure 2:
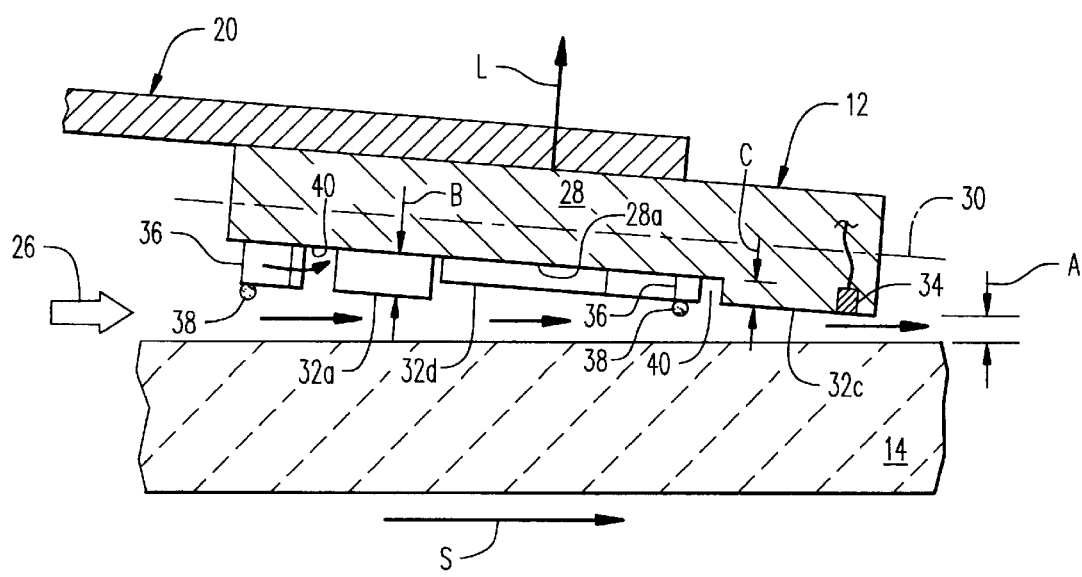
FIG. 2 is an elevational sectional view along the centerline of the slider illustrated in FIG. 1 atop a portion of the spinning disk.

FIG. 2 illustrates in more particularity the slider 12 in accordance with an exemplary embodiment of the present invention suspended from the arm 20 atop the spinning disk 14. The slider 12 is slightly tilted atop the upper surface of the disk 14 at a suitable tilt angle on the order of about 300 microradians for example to develop an air bearing therebetween as ambient air 26 is frictionally drawn therebetween by spinning of the disk 14 during operation. The air bearing developed by the slider 12 during operation suspends or floats the slider 12 atop the disk 14 at a suitable fly height A near the slider aft end, and has a value of about 50 nanometers for example.

Figure 3:
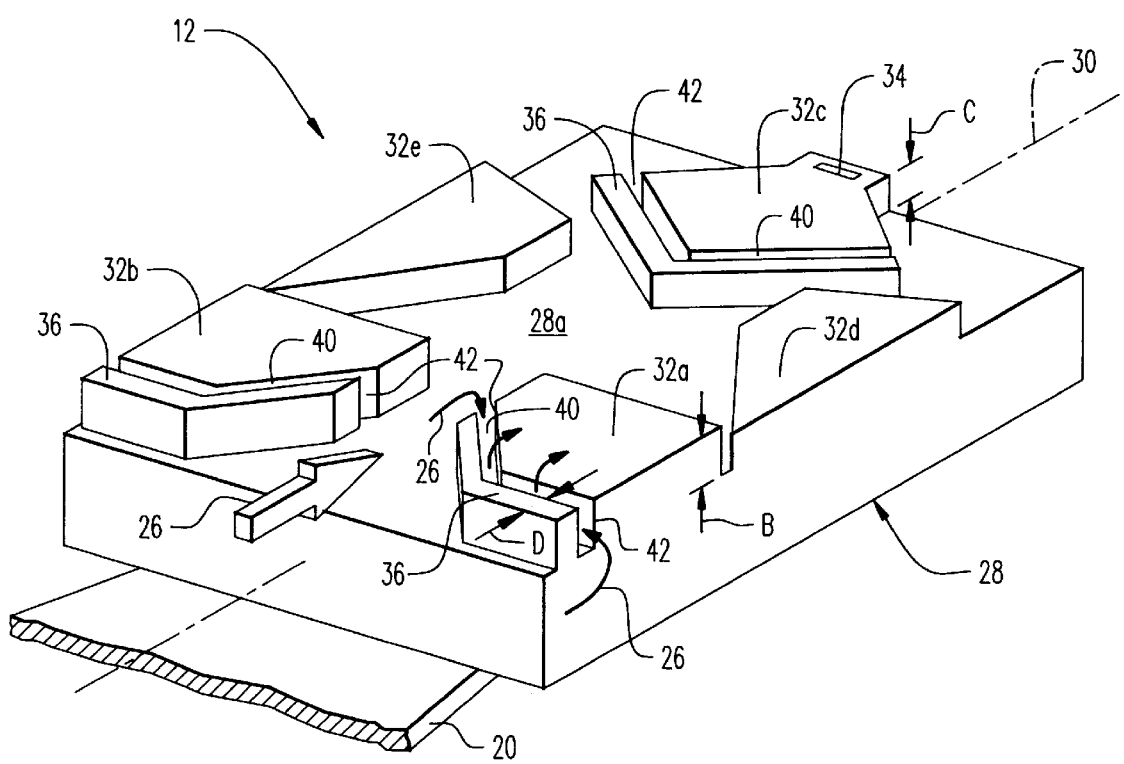

FIG. 3 illustrates the underside of the slider 12 in accordance with an exemplary embodiment of the present invention. As shown in both FIGS. 2 and 3, the slider 12 includes a suitable substrate or body 28 which is generally rectangular in the exemplary embodiment illustrated and may be formed of any suitable material such as Titanium-Carbide and Aluminum oxide sintered together, for example. The substrate 28 has a longitudinal or centerline axis 30 which is generally coextensive with the suspension arm 20. The centerline axis 30 is also generally aligned at a tangent to the spinning disk 14 along the direction of spinning S when the slider is positioned near the innermost recording track.

As illustrated in more detail in FIG. 3, the substrate 28 includes a planar or flat lower or base surface 28a which faces the disk 14, and an opposite top surface to which the suspension arm 20 is suitably attached.

The slider 12 also includes one or more integral air bearing pads, designated generally by the prefix 32, extending outwardly away from the substrate base surface 28a for cooperating with the spinning disk 14 to develop respective air bearings thereon for supporting the slider thereabove. Since the slider material is typically extremely hard and stiff, the several pads 32 may be formed therein by conventional reaction ion etching (RIE) or ion milling for example. The individual pads 32 define respective flat lands which face the disk 14 for developing the air bearings therebetween. The pads 32 may have any conventional configuration and placement on the substrate 28, with an exemplary embodiment being illustrated in FIG. 3.

In this embodiment, a plurality of the pads 32 are spaced apart over the base surface 28a in a generally conventional arrangement. This arrangement includes a pair of forward first and second pads 32a,b disposed at the forward or upstream end of the slider 12 symmetrically about the centerline axis 30 near opposite sides of the slider. A single aft pad 32c is positioned at the aft or downstream end of the slider 12 and centered between the forward pads 32a,b symmetrically about the centerline axis 30. And, another pair of first and second outboard pads 32d,e are symmetrically disposed about the centerline axis 30 near the opposite sides of the slider 12 and longitudinally between the forward pads 32a,b and the aft pad 32c. The outboard pads 32d,e are therefore disposed aft of respective ones of the forward pads 32a,b and in most part forward of the aft pad 32c for providing stability and damping during operation.

All five pads 32a–e may be initially formed as indicated above by material removal from the surface of the substrate 28 leaving the pads as outwardly projecting lands. The general configuration and positions of the pads 32 atop the substrate 28 is conventional, as shown for the exemplary embodiment illustrated in FIG. 3. Furthermore, the forward pads 32a,b have a height B and are preferably taller than the aft pad 32c which has a shorter height C. And, the outboard pads 32d,e preferably have the same shorter height as the aft pad 32c.

All five pads 32a–e may initially have the same height C during manufacture, about 20 microns for example. The additional height for the forward pads 32a,b may be obtained by depositing a relatively thin wear resistance layer thereatop, such as Nickel Chrome Oxide ($NiCrO_x$) with a carbon overcoat. This layer may be conventionally deposited by sputtering, for example, to a height less than about 1 micron so that the total height of the forward pads 32a,b is between 20 and 21 microns for example. The difference in height between the forward and aft pads assists air bearing development with a corresponding relatively small tilt angle of the respective pads of about 300 microradians as indicated above.

As shown in FIGS. 2 and 3, the slider 12 also includes a data access element 34 fixedly mounted in the substrate 28 through the aft pad 32c for suitably communicating data with the disk 14. In a typical disk drive, the access element 34 is configured for magnetically writing data to the disk 14 or reading data therefrom, or both in a corresponding single or dual read/write element. The access element 34 is suitably electrically joined in a circuit in the disk drive 10 for communicating data to and from the disk 14 in a conventional manner.

As indicated above, the slider 12 may include one or more air bearing pads arranged in any conventional manner. During operation as illustrated in FIG. 2, each of the bearing pads 32 is slightly inclined at the pad tilt angle with the top surface of the disk 14 as it rotates which causes the air 26 to develop corresponding air bearings between each of the pads 32 and the disk 14 for producing a lift force L on the slider 12 which suspends the slider and the access element 34 over the spinning disk 14 on blankets of air. The resulting fly height A is typically minimum at the aft end of the aft bearing pad 32c, and increases to the forward or upstream end of the slider 12.

Each of the bearing pads 32 includes a leading or upstream edge which first receives the airflow 26, and defines with the disk 14 corresponding pad inlets for channeling the air over the individual pads to create respective portions of the aerodynamic lift force L. The pads 32 are inlet-throttled in a conventional manner, also known as taperless slider, as the air converges between the pads and disk in the downstream direction.

Since the ambient air 26 found within the housing 16 typically includes extremely small, micron sized debris, conventional bearing pads are subject to debris accumulation along their leading edges over extended use which progressively closes the pad inlets with a reduction in lift generation and eventual disk crash when sufficient lift is no longer generated. This problem is solved in accordance with the present invention by providing a relatively narrow or thin guard strip or shield 36 as shown in FIGS. 2 and 3 extending outwardly from the base surface 28a and spaced from selected ones of the bearing pads 32 to protect or shield the respective bearing pads.

The guard strips 36 effect an improved method for reducing or preventing debris clogging along selected bearing pads of the slider 12 which improves the operation and longevity thereof. As indicated above, the air 26 illustrated in FIG. 2 is initially inlet-throttled between the spinning disk 14 and respective ones of the bearing pads 32, and may include the micron-size debris therein. The guard strips 36 are preferentially sized, configured, and positioned in accordance with the present invention for directly shielding respective bearing pads 32 along the leading edges thereof from the debris entrained in the air 26 to reduce debris clogging on the pads 32 themselves. Since the strips 36 shield the respective bearing pads 32, the debris will instead accumulate primarily atop the strips 36 as indicated in FIG. 2 by the debris accumulation 38, with reduced or no accumulation of the debris on the protected bearing pads 32.

As shown in FIG. 3, each guard strip 36 is preferably disposed upstream from the respective bearing pad 32 and is laterally coextensive therewith to block or shield the pad leading edge from the debris in the air 26. Since the primary purpose of the guard strips 36 is to shield respective ones of the bearing pads 32, the strips 36 are preferably narrower than the respective pads 32 in the downstream flow direction along the slider centerline axis 30. Each guard strip 36 has a width D in the flow direction which is preferably as small as practical for providing sufficient strength to the strip 36 while providing effective shielding ; of a corresponding bearing pad 32. For example, the strip width D may be about 20 microns which is about an order of magnitude less than the corresponding nominal width of the respective bearing pads 32 along the centerline axis 30.

Each guard strip 36 is preferably disposed upstream from a respective one of the pads 32 to define a corresponding slot or trench 40 therebetween. The trench 40 may be simultaneously manufactured when forming the respective guard strips 36 when portions of the substrate 28 are removed for initially forming the several bearing pads 32 and guard strips 36 simultaneously all in a unitary or one-piece substrate assembly. The guard strips 36 are preferably parallel to the leading edges of the bearing pads 32 and open in a substantially uniform width trench 40 therebetween in the preferred embodiment. The individual trenches 40 are as narrow as practical for separating the guard strips 36 from their respective bearing pads 32. The width of the trenches 40 is preferably substantially larger than the fly height A, and may be about 5 to 10 microns wide for example.

In the exemplary embodiment illustrated in FIG. 3 there are five bearing pads 32*a,e*, and a suitable number of the guard strips 36 are provided for cooperating with selected ones thereof. For example, the two forward bearing pads 32*a,b* include respective guard strips 36 cooperating therewith, and the single aft bearing pad 32*c* also includes a cooperating guard strip 36 therewith. Since the forward and aft bearing pads provide the main lifting force in the slider 12, shielding guard strips 36 therefor are preferred.

Accordingly, the stabilizing or damping outboard bearing pads 32*d,e* need not include respective guard strips 36 cooperating therewith since they provide secondary lift, and since they are spaced further away from the spinning disk 14 during operation in view of their decreased height, and their position between the forward and aft bearing pads which allows a greater amount of debris accumulation thereon without adverse performance. If desired, however, additional ones of the guard strips 36 may be formed upstream of the outboard bearing pads 32*d,e* for providing shielding thereof.

As shown in FIG. 3, the forward and aft bearing pads 32*a–c* have different configurations, and the cooperating guard strips 36 are correspondingly configured to conform with the differently configured leading edges thereof. The guard strips 36 preferably extend the entire leading edge of the respective bearing pads, although the strips 36 may be shorter if desired. The guard strips 36 and respective bearing pads 32 are also preferably coplanar along their outer surfaces with the same height from the base surface 28*a*. For the aft bearing pad 32*c*, which has a chevron or V-shaped leading edge, the cooperating guard strip 36 is similarly chevron-shaped and may be conveniently manufactured in the same manner as the aft pad 32 during removal of the outer layer of the substrate 28. In this way, the aft pad 32*c* and its guard strip 36 will have the same height C when manufactured.

Similarly, the guard strips 36 for the forward bearing pads 32*a,b* and cooperating trenches 40 may be formed initially by removal of outer portions of the substrate 28, with the additional height of the pads and strips being obtained by deposition of the common wear-resistance coating or layer thereon.

In this way, the complete upstream projections of the respective forward and aft bearing pads 32*a–c* are shielded by the respective guard strips 36 along their entire leading edges for maximizing debris shielding thereof. In alternate embodiments, the respective guard shield 36 may be shorter or taller than the respective bearing pads as testing and experience dictates.

As shown in FIG. 2, the debris 38 will primarily accumulate along the respective guard strips 36 instead of the associated bearing pads 32. Although the forward bearing pads 32*a,b* are spaced upstream from the aft and outboard pads 32*c–e*, debris may nevertheless reach the back pads due to the inlet throttling of the air 26 below each of the pads. As the debris 38 accumulates along each of the guard strips 36, the effective inlet area for the air 26 to the respective bearing pads is decreased which can decrease the lifting performance of the bearing pads.

However, in accordance with another feature of the present invention as illustrated in FIG. 3, each of the trenches 40 defined between the bearing pads 32 and their cooperating guard strips 36 preferably includes a trench inlet 42 for channeling a portion of the air 26 therein. The trenches 40 are simple slots which open between the tops of the guard strips and bearing pads 30 and are therefore disposed in flow communication with the respective pad leading edges for discharging the air portions received by the inlets 42 over the respective bearing pads 32 as an additional source of bearing air for maintaining effective lift operation of the bearings.

In the preferred embodiment illustrated in FIG. 3, each trench 40 includes a pair of end inlets 42 disposed at respective opposite ends of each of the guard strips 36 for feeding the air 26 from the sides of the bearing pads 32 through the trenches 40 and over the pad leading edges for bypassing the accumulated debris 38 shown in FIG. 2. In this way, a portion of the air 26 is channeled or redirected around the individual guard strips 36 as the debris accumulates and clogs the primary airflow for flow over the pad leading edges for additionally providing air over the pads 32 for ensuring effective generation of lift during operation.

The guard strips 36 are preferably narrow in view of the limited size of the slider 12 itself. Space in a disk drive is always at a premium, and sliders 12 correspondingly have limited sized as well. The slider 12 must nevertheless provide sufficient lift for suitably suspending the slider atop the spinning disk 14. Since the forward bearing pads 32*a,b* are necessarily located at the forwardmost two corners of the slider 12, the use of the guard strips 36 at their leading edges necessarily reduces the available surface area for the generation of lift by the forward bearing pads 32*a,b*. By keeping the width of the guard strips 36 for the forward bearing pads 32*a,b* as small as practical, reduction in the lift generating capability of the forward pads is correspondingly limited. Any lift generated by the thin guard strips 36 themselves is insignificant, although the guard strips 36 contribute beneficially to damping of the slider 12 during operation. Since the aft bearing pad 32*c* is disposed at the aft end of the slider 12, the cooperating guard strip 36 is therefore positioned in the available space upstream therefrom which does not reduce the lift capability of the aft pad 32*c*.

The guard strips 36 provide protection of the main load bearing pads of the slider 12 by intercepting debris immediately ahead thereof. In the event the guard strips themselves become loaded with debris, the main load bearing pads can still draw air from the narrow trenches 40 which bypasses the accumulated debris. Since the trench inlets 42 preferably face laterally and not immediately upstream, debris obstruction thereof is unlikely for maintaining a continuous supply of air to the respective bearing pads. In view of the chevron shape of the aft guard strips 36, the respective end inlets 42 thereof face in the aft direction and are more fully protected against debris ingestion therein.

The guard strips 36 may take any suitable configuration for shielding the respective bearing pads from debris accumulation during operation. Although a single guard strip is illustrated for each of the bearing pads, two or more parallel guard strips may be used for additional shielding if desired and where space permits. The trench inlet 42 may also be located differently depending upon the specific configuration of the guard strips 36.

The several bearing pads 32 illustrated in FIG. 3 are inlet-throttled in the exemplary embodiment. Inlet-throttling controls the amount of air that can enter the bearing independent of the disk speed. The amount of air entering below each bearing pad is proportional to the leading edge gap of the bearing pads and the disk 14. When this gap is partially obstructed by debris accumulation, the effective inlet height is correspondingly smaller, allowing less air to flow into the bearing gap. This decreases the performance of the bearing pads and also lowers the equilibrium flying height of the slider. However, the guard strips 36 ensure that adequate airflow is maintained below each of the bearing pads irrespective of debris accumulation on the guard strips themselves. The guard strips 36 may also be used in a non-inlet throttled bearing design if desired.

While there have been described herein what are considered to be preferred and exemplary embodiments of the present invention, other modifications of the invention shall be apparent to those skilled in the art from the teachings herein, and it is, therefore, desired to be secured in the appended claims all such modifications as fall within the true spirit and scope of the invention.

Accordingly, what is desired to be secured by Letters Patent of the United States is the invention as defined and differentiated in the following claims:

I claim:

1. A slider for developing an air bearing atop a spinning data disk comprising:

a substrate having a base surface and an air bearing pad extending outwardly therefrom for cooperating with said spinning disk to develop said air bearing thereon for supporting said slider thereabove;

a data access element fixedly mounted in said substrate for communicating data with said disk; and a guard strip extending without taper outwardly from said base surface and spaced from said pad to define a trench therebetween;

said pad including a pad leading edge for defining with said disk a pad inlet for channeling air over said pad to lift said slider;

said guard strip being disposed upstream from said pad leading edge and laterally coextensive therewith, said guard strip being parallel to said pad leading edge such that said guard strip has a substantially uniform width wherein said strip width is measured along a direction from a slider leading edge to a slider trailing edge, and said trench having a substantially uniform width with said trench width being measured along a direction from said slider leading edge to said slider trailing edge, such that said trench width is narrower than said strip width;

said trench including an end inlet disposed at one end of said strip for channeling air through said trench and over said pad leading edge bypassing a leading edge of said guard strip, and said trench extending in depth to said substrate base surface; and whereby said guard strip minimizes accumulation of debris at said pad leading edge with said guard strip providing minimal air lift relative to said air bearing pad.

2. A slider according to claim 1 wherein said pad includes a continuous flat, taperless land.

3. A slider according to claim 2 wherein said strip and trench are narrower than said pad.

4. A slider according to claim 3 wherein said trench includes a pair of said inlets at opposite ends of said strip.

5. A slider according to claim 3 wherein said pad and strip are coplanar.

6. A slider according to claim 3 further comprising a plurality of said pads and cooperating guard strips spaced apart over said base surface.

7. A slider according to claim 6 wherein said pads and cooperating guard strips are arranged in a pair of symmetrically spaced laterally apart forward pads and strips, and a single aft pad and strip centered therebetween.

8. A slider according to claim 7 wherein said forward pads and strips are taller than said aft pad and strip.

9. A slider according to claim 8 further comprising an additional pair of pads disposed aft of respective ones of said forward pads and forward of said aft pad.

10. A slider according to claim 8 wherein said data access element is disposed in said aft pad.

11. A slider according to claim 8 wherein said forward and aft pads have different configurations, and said cooperating strips conform with said forward and aft pads.

12. A method for reducing debris clogging of a slider supporting a data access element atop a spinning data disk comprising:

throttling air between said spinning disk and an air bearing pad extending outwardly from said slider, with a leading edge of said pad defining with said disk a pad inlet for channeling said air over said pad to lift said slider;

shielding said slider solely along said pad leading edge from debris in said air to reduce debris clogging at said pad leading edge, with said shielding being effected closely adjacent to said leading edge within a distance less than a thickness of said pad to minimize loss of slider lift therefrom; and wherein said shielding is effected by:

forming a guard strip without taper upstream of said pad leading edge and laterally coextensive therewith to provide a trench between said guard strip and said pad;

said guard strip being parallel to said pad leading edge such that said guard strip has a substantially uniform width, with said strip width being measured along a direction from a slider leading edge to a slider trailing edge, and said trench having a substantially uniform width, with said trench width being measured along a direction from said slider leading edge to said slider trailing edge, such that said trench width is narrower than said strip width;

said trench including a pair of end inlets disposed at respective opposite ends of said guard strip for channeling air through said trench and over said pad leading edge bypassing a leading edge of said guard strip, with a depth of said trench extending to a substrate base surface adjacent said pad; and whereby said guard strip minimizes accumulation of debris at said pad leading edge, with said guard strip providing minimal air lift relative to said air bearing pad.

* * * * *